US 6,553,439 B1

(12) United States Patent
Greger et al.

(10) Patent No.: US 6,553,439 B1
(45) Date of Patent: Apr. 22, 2003

(54) REMOTE CONFIGURATION ACCESS FOR INTEGRATED CIRCUIT DEVICES

(75) Inventors: Michael J. Greger, Hillsboro, OR (US); Eric R. Wehage, Tenino, WA (US); Toshiyuki Sakuta, Tokyo (JP)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,390

(22) Filed: Aug. 30, 1999

(51) Int. Cl.[7] .......................... G06F 13/14; G06F 13/42
(52) U.S. Cl. ................. 710/62; 710/8; 710/9; 710/11; 710/36; 710/39; 710/64
(58) Field of Search ............................ 710/8, 9, 11, 36, 710/39, 62, 64

(56) References Cited

U.S. PATENT DOCUMENTS

| | | | | |
|---|---|---|---|---|
| 5,590,353 A | * | 12/1996 | Sakakibara et al. | 708/520 |
| 5,805,844 A | * | 9/1998 | Gustin et al. | 710/22 |
| 5,898,688 A | * | 4/1999 | Norton et al. | 370/362 |
| 5,983,282 A | * | 11/1999 | Yucebay | 709/225 |
| 6,122,748 A | * | 9/2000 | Hobson | 710/104 |
| 6,266,701 B1 | * | 7/2001 | Sridhar et al. | 370/465 |
| 6,389,464 B1 | * | 5/2002 | Krishnamurthy et al. | 709/220 |

OTHER PUBLICATIONS

Intel® 450NX PCIset, Revision 1.3, Intel Corporation, pp. i–vi, 1–1 to 1–4, 2–1 to 2–20, 3–1 to 3–48, 4–1 to 4–8, 5–1 to 5–4, 6–1 to 6–6, 7–1 to 7–5, 8–1 to 8–4, 9–1 to 9–4, 10–1 to 10–2, 11–1 to 11–10, and 12–1 to 12–88 (Mar. 1999).

* cited by examiner

Primary Examiner—Christopher B. Shin
Assistant Examiner—Rehana Perveen
(74) Attorney, Agent, or Firm—Blakely, Sokoloff, Taylor & Zafman LLP (57) ABSTRACT

A local integrated circuit device provides remote configuration access to one or more remote integrated circuit devices. The local integrated circuit device receives configuration access requests through at least two interfaces. The local integrated circuit device accesses a configuration space of one or more remote integrated circuit devices in accordance with the received configuration access requests.

24 Claims, 5 Drawing Sheets

REMOTE CONFIGURATION ACCESS FOR INTEGRATED CIRCUIT DEVICES

BACKGROUND OF THE INVENTION

1. Field of the Invention

The present invention relates generally to the field of integrated circuit device configuration. More particularly, the present invention relates to the field of configuration access for integrated circuit devices.

2. Description of Related Art

The Intel® 450NX PCIset provides an integrated Host-to-Peripheral Component Interconnect (PCI) bridge and memory controller optimized for multiprocessor systems and standard high-volume (SHV) servers. This chipset interfaces with a processor bus that supports up to four Pentium® II Xeon™ processors and comprises four integrated circuit devices: 82454NX PCI Expander Bridge (PXB), 82451NX Memory and Input/Output (I/O) Bridge Controller (MIOC), 82452NX Row Address Strobe and Column Address Strobe (RAS/CAS) Generator (RCG), and 82453NX Data Path Multiplexor (MUX). The MIOC can support two PXBs to provide two independent PCI buses with an option to link the two buses into a single, wider bus. The MIOC also supports one or two memory cards each comprised of an RCG, a dynamic random access memory (DRAM) array, and two MUXs.

The MIOC accepts access requests from the processor bus and directs those accesses to memory or one of the PCI buses. The MIOC also accepts requests from the PCI buses. The MIOC provides the data port and buffering for data transferred between the processor bus, PXBs, and memory. In addition, the MIOC generates the appropriate controls to the RCGs and MUXs to control data transfer to and from memory. The RCG is responsible for accepting memory requests from the MIOC and converting these into the specific signals and timings required by the DRAM. The MUX provides the multiplexing and staging required to support memory interleaving between the DRAMs and the MIOC.

Each integrated circuit device of the chipset comprises internal control and status registers to configure how the device is to function and to monitor operating conditions of the device. Such registers of each device are accessible through a Joint Test Action Group (JTAG) Test Access Port (TAP) of the device.

A processor coupled to the chipset may also access control and status registers that reside in a configuration space for the MIOC or in either of two configuration spaces for the PXB, one for each PCI bus. Such configuration spaces are accessible through a configuration address register and a configuration data register that reside in the processor I/O address space. The configuration address register identifies a target configuration register or other suitable memory location in accordance with the PCI addressing format for a configuration access request. The configuration data register defines read or write data for a configuration access to the location identified by the configuration address register.

When the MIOC detects an I/O request from a processor is a configuration access request directed to the configuration space of the MIOC, the MIOC performs the configuration access within the MIOC. For configuration reads, the MIOC returns the read data to the processor bus. When the MIOC detects an I/O request from a processor is a configuration access request directed to a PXB configuration space, the MIOC forwards the request to the appropriate PXB. For configuration reads, the PXB performing the read returns the read data to the processor bus through the MIOC.

During system bring-up and debug, however, remote access to the configuration space of the MIOC and PXBs through processor reads and writes may not be possible. Also, any test or debug device using the local JTAG port of the MIOC or PXB must be capable of generating the native configuration protocol for the MIOC or PXB, respectively.

BRIEF SUMMARY OF THE INVENTION

A local integrated circuit device receives configuration access requests through at least two interfaces and accesses a configuration space of one or more remote integrated circuit devices in accordance with the received configuration access requests.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for remote configuration access for integrated circuit devices. In the following description, details are set forth such as specific integrated circuit devices, ports, communication protocols, etc., in order to provide a thorough understanding of the present invention. It will be evident, however, that the present invention may be practiced without these details. In other instances, well-known computer components, etc., have not been described in particular detail so as not to obscure the present invention.

EXEMPLARY CHIPSET-BASED SYSTEM

Figure 1:
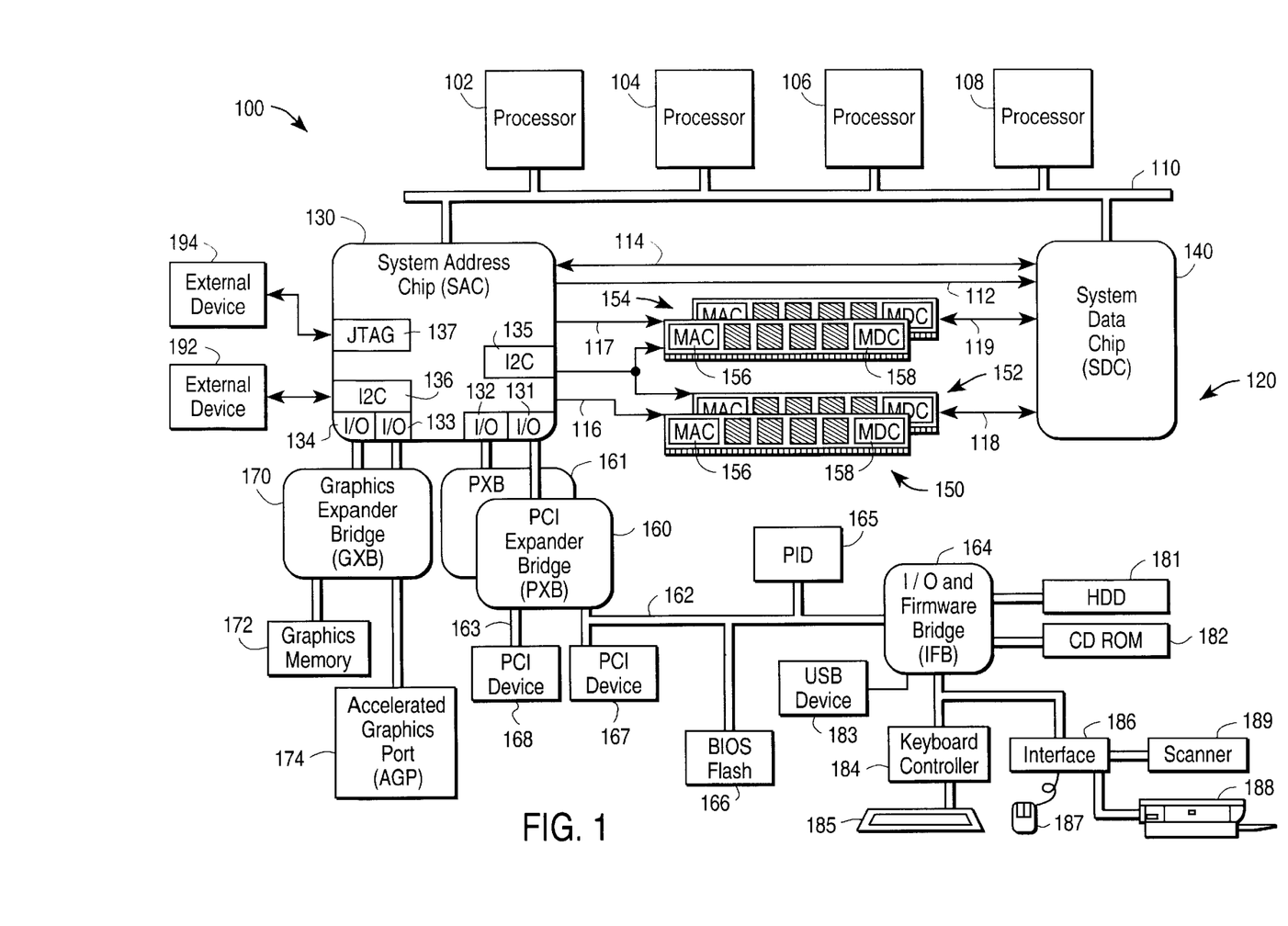
FIG. 1 illustrates an exemplary multiprocessor chipset-based system having remote configuration access through at least two interfaces of a system address chip (SAC)

FIG. 1 illustrates an exemplary chipset-based system 100 having remote configuration access through at least two interfaces of an integrated circuit device. Although described in the context of system 100, the present invention may be implemented in any suitable system.

As illustrated in FIG. 1, system 100 comprises processors 102, 104, 106, and 108, a processor bus 110, and a memory and input/output (I/O) chipset 120. Processors 102, 104, 106, and 108 and chipset 120 are coupled to processor bus 10. System 100 for other embodiments may comprise one, two, three, or more than four processors.

Chipset 120 comprises a system address chip (SAC) 130 coupled to an address portion of processor bus 110 and a system data chip (SDC) 140 coupled to a data portion of processor bus 110. SAC 130 and SDC 140 for one embodiment are coupled to one another by a private command bus 112 and a private data bus 114. A main memory 150 is coupled between SAC 130 and SDC 140. Chipset 120 also comprises, for I/O access, two peripheral component interconnect (PCI) expander bridges (PXBs) 160 and 161 coupled to SAC 130 and an optional graphics expander bridge (GXB) 170 coupled to SAC 130. Chipset 120 for other embodiments may comprise only one, three, or four PXBs, for example. SAC 130 and SDC 140 provide an interface to processor bus 110 and provide control and data routing for main memory 150 and I/O access through PXBs 160 and 161 and GXB 170.

Main memory 150 for one embodiment comprises two memory subsystems 152 and 154. Each memory subsystem 152 and 154 may,comprise any suitable memory, such as synchronous dynamic random access memory (SDRAM) for example. Each memory subsystem 152 and 154 comprises one or more memory address chips (MACs) 156 and one or more memory data chips (MDCs) 158. Each memory subsystem 152 and 154 for one embodiment comprises a memory card having two MACs 156 and four MDCs 158. MACs 156 and MDCs 158 belong to chipset 120. MACs 156 for one embodiment provide SDRAM row address strobe and column address strobe (RAS/CAS) generation and redriving of addresses to SDRAM. MDCs 158 for one embodiment multiplex data from SDRAM to SDC 140. On reads, MDCs 158 latch data from SDRAM and transfer the data to SDC 140 a predetermined number of bits at a time. On writes, MDCs 158 latch data from SDC 140 and write the data to SDRAM. SAC 130 for one embodiment addresses each memory subsystem 152 and 154 over a memory address bus 116 and 117, respectively. SDC 140 for one embodiment receives data from and transfers data to each memory subsystem 152 and 154 over a memory data bus 118 and 119, respectively.

PXB 160 provides a control and data interface for two independent PCI buses 162 and 163. PXB 160 may optionally be configured to operate each PCI bus 162 and 163 together as a single, wider PCI bus. PXB 161 functions similarly as PXB 160. Each PXB 160 and 161 is coupled to SAC 130 through an I/O port 131 and 132, respectively. Any suitable port may be used for I/O ports 131 and 132. I/O ports 131 and 132 for one embodiment are each an F16 port. GXB 170 provides a control and data interface for a graphics memory device 172 and an accelerated graphics port (AGP) 174. GXB 170 for one embodiment is coupled to SAC 130 through two I/O ports 133 and 134. Any suitable port may be used for I/O ports 133 and 134. I/O ports 133 and 134 for one embodiment are each an F16 port.

Chipset 120 further comprises a compatibility I/O and firmware bridge chip (IFB) 164, a programmable interrupt device (PID) 165, and a basic input/output system (BIOS) flash controller 166 each coupled to PCI bus 162. PCI bus 162 serves as a compatibility bus and supports IFB 164 for interfacing with suitable compatibility components such as, for example, a hard disk drive (HDD) 181, a compact disc read only memory (CD ROM) device 182, a suitable universal serial bus (USB) device 183, a keyboard controller 184 for controlling a keyboard 185, and a suitable interface 186 for a mouse 187, a printer 188, and a scanner 189. PID 165 is a PCI device that gathers interrupts and delivers them from PCI bus 162 to processor bus 110 through PCI writes to a predetermined address. One or more other suitable PCI devices 167 and 168 may be coupled to PCI buses 162 and 163.

LOCAL AND REMOTE CONFIGURATION ACCESS

SAC 130, SDC 140, each MAC 156, each MDC 158, PXBs 160 and 161, and GXB 170 each comprise internal control and status registers to configure how the device is to function and to monitor operating conditions of the device. One or more suitable devices coupled to PXB 160, PXB 161, or GXB 170 may also comprise such registers. Chipset 120 provides a PCI-compatible configuration space for SAC 130, SDC 140, each MAC 156, each MDC 158, and GXB 170 and provides two PCI-compatible configuration spaces for each PXB 160 and 161, one for each PCI bus. The control and status registers within each device reside within at least a portion of the configuration space of the device. The configuration space for each device may comprise any suitable configuration registers and/or any other suitable configuration memory devices for the device.

SAC 130, SDC 140, each MAC 156, each MDC 158, PXBs 160 and 161, and GXB 170 may each comprise one or more suitable local ports or interfaces for access to the local configuration space of the device. A suitable test or debug device or a suitable system management device, for example, may issue a suitable configuration access request to a port or interface of a device for read or write access to the local configuration space of the device. For one embodiment, each device may have a suitable Joint Test Action Group (JTAG) Test Access Port (TAP) and/or an inter-integrated circuit ($I^2C$ or I2C) port for access to the local configuration space of the device. One JTAG protocol is defined under IEEE standard 1149.1. One I2C protocol is defined by Philips Semiconductors, a product division of Philips Electronics N.V., headquartered in Eindhoven, The Netherlands.

SAC 130 also provides remote access to the configuration space of another device. SAC 130 may provide access to the configuration space of any suitable remote or external device in any suitable manner. SAC 130 for one embodiment provides remote access to the configuration space of SDC 140, each MAC 156, each MDC 158, PXB 160, PXB 161, GXB 170, and any suitable device coupled to PXB 160, PXB 161, and GXB 170. SAC 130 for one embodiment accesses the configuration space of each MAC 156 and each MDC 158 through an I2C master port 135. SAC 130 therefore accesses the configuration space of remote devices using different communication protocols. For other embodiments, SAC 130 may provide access to the configuration space of any combination of suitable remote devices in any suitable manner.

SAC 130 comprises at least two interfaces for receiving configuration access requests. In addition to receiving remote configuration access requests through such interfaces, SAC 130 may receive local configuration access requests, that is requests to access the local configuration space of SAC 130.

SAC 130 may receive configuration access requests from any suitable external device through any suitable interface in any suitable manner. SAC 130 for one embodiment comprises a processor interface for receiving configuration access requests from processors 102, 104, 106, and 108 over processor bus 110, a PCI interface to PXBs 160 and 161 and GXB 170 for receiving configuration access requests from a suitable PCI device, an I2C slave port 136 for receiving configuration access requests from a suitable external device 192, such as a server management device for example, and a JTAG port 137 for receiving configuration access requests from a suitable external device 194, such as a suitable test or debug device for example. SAC 130 therefore receives configuration access requests using different communication protocols. For other embodiments, SAC 130 may receive configuration access requests through any combination of any suitable interfaces.

Figure 2:
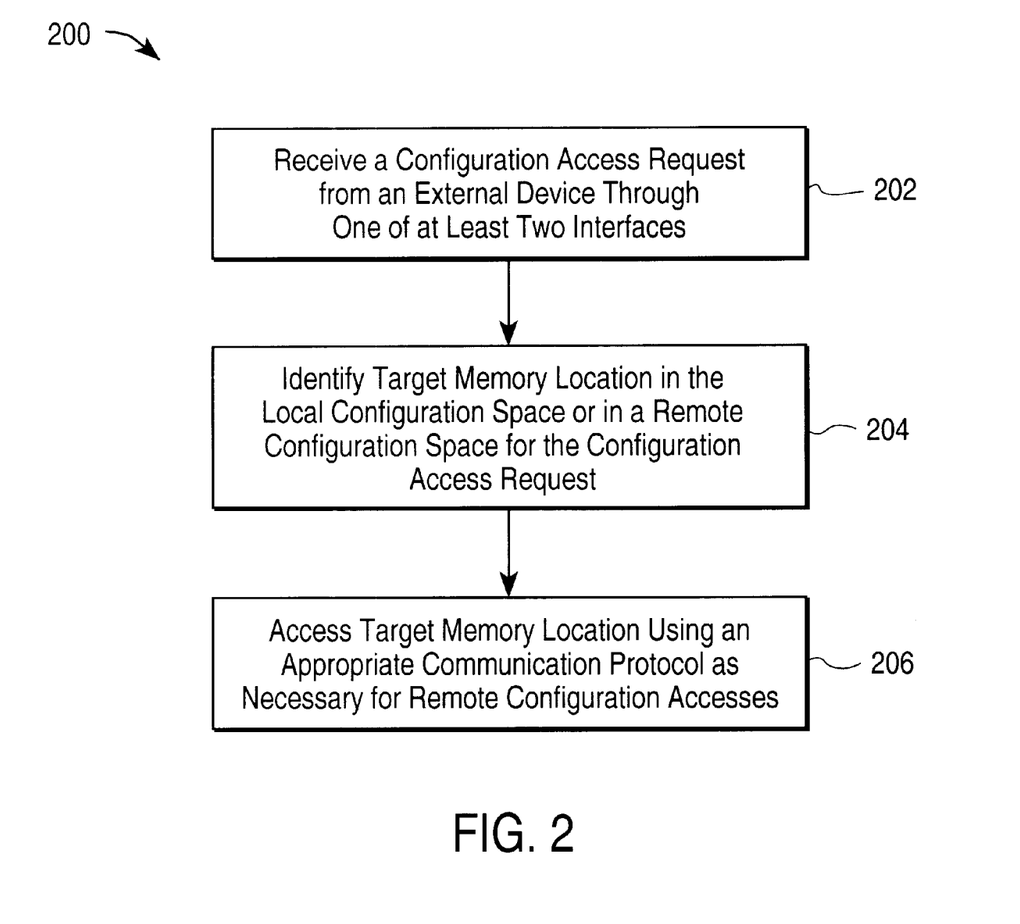
FIG. 2 illustrates, for one embodiment, a flow diagram for configuration access through at least two interfaces of an integrated circuit device.

FIG. 2 illustrates, for one embodiment, a flow diagram 200 for configuration access through SAC 130.

For step 202 of FIG. 2, SAC 130 receives a configuration access request from an external device through one of at least two interfaces. SAC 130 for one embodiment arbitrates among requests received at different interfaces. When SAC 130 is able to process the configuration access request, SAC 130 for step 204 identifies the target memory location in the local configuration space of SAC 130 or in the configuration space of a remote device for the configuration access request. For step 206, SAC 130 accesses the target memory location using an appropriate communication protocol as necessary for remote configuration accesses.

As SAC 130 may receive configuration access requests using one communication protocol and perform the requested configuration access using another communication protocol, SAC 130 in effect translates or converts received configuration access requests to enable different requesting devices to access the configuration space of any suitable target device without requiring that the requesting device communicate directly with the target device and/or communicate in the native communication protocol of the target device. Different requesting devices may also access the configuration space of any suitable target device that is lacking a JTAG and/or I2C port for local configuration accesses or that has a non-operational JTAG and/or I2C port.

Also, by providing at least one interface for receiving remote configuration access requests in addition to the processor interface, SAC 130 may be used for configuration accesses during system bring-up and debug when configuration accesses through processor reads and writes may not be possible.

Although described in the context of SAC 130 within chipset 120, the present invention may be implemented to provide any suitable integrated circuit device with local configuration access and/or with remote configuration access to any other suitable integrated circuit device.

SYSTEM ADDRESS CHIP (SAC)

Figure 3:
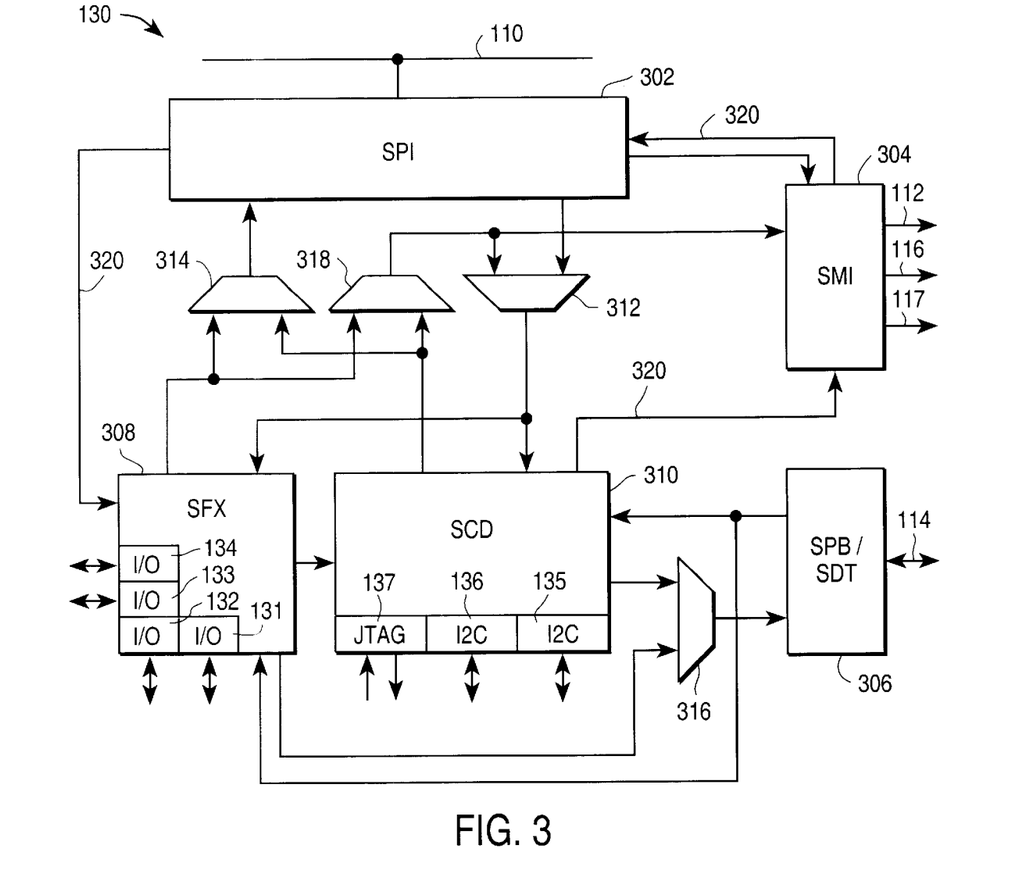
FIG. 3 illustrates, for one embodiment, the SAC of FIG. 1.

SAC 130 may comprise any suitable circuitry for providing remote configuration access through at least two interfaces. For one embodiment, as illustrated in FIG. 3, SAC 130 comprises a system processor interface (SPI) 302, a SAC memory interface (SMI) 304, a SAC private bus and SAC data target interface (SPB/SDT) 306, a SAC F16 expander interface (SFX) 308, and a SAC configuration and debug interface (SCD) 310. Although identified as an F16 expander interface, SFX 308 may provide an expander interface for any suitable I/O port. SPI 302, SMI 304, SPB/SDT 306, SFX 308, and SCD 310 may each comprise any suitable circuitry.

SPI 302 interfaces with processors 102, 104, 106, and 108 over processor bus 110 and interfaces with SFX 308 and SCD 310 through multiplexors 312 and 314. SPI 302 is also coupled to SMX 304 to report transactions sent to SFX 308 or SCD 310, allowing SMI 304 to monitor traffic from SPI 302 to SFX 308 and SCD 310. SMX 304 controls the transfer of command information to SDC 140 over private command bus 112 and the transfer of memory address information over memory address buses 116 and 117. SPB/SDT 306 interfaces with SFX 308 and SCD 310 through multiplexor 316 and controls the transfer of data to and from SDC 140 over private data bus 114. SFX 308 interfaces with PXBs 160 and 161 through I/O ports 131 and 132, respectively, and with GXB 170 through I/O ports 133 and 134. SFX 308 for other embodiments may be configured as one, two, or more SFX interfaces, each having two I/O ports. SFX 308 also interfaces with SMI 304 through multiplexor 318 and with SCD 310 through multiplexors 318 and 312. SCD 310 interfaces with each MAC 156, each MDC 158, and any suitable I2C device through I2C master port 135, interfaces with external device 192 through I2C slave port 136, and interfaces with external device 194 through JTAG port 137. SCD 310 also interfaces with SMI 304 through multiplexor 318.

SPI 302, SMI 304, SFX 308, and SCD 310 are also coupled to one another along a SAC internal configuration ring bus 320 in which address, data, and/or command information initiated by SCD 310, for example, is transferred to SMI 304, then to SPI 302, then to SFX 308, and back to SCD 310. For one embodiment, configuration ring bus 320 comprises nine bits. One bit strobes the beginning of a transaction. Each transaction is eight bytes long where one byte or eight bits are transferred each clock for a total of eight clocks. A transaction may have, for example, four command/address bytes and four data bytes. Each target on ring bus 320 may comprise a set of one or more registers that are read from and written to in accordance with the address and command information transmitted on ring bus 320.

SFX 308 and/or SCD 310 control access to local and remote configuration spaces in accordance with configuration access requests received by SPI 302 from one or more processors 102, 104, 106, and 108, received by SFX 308 from any suitable PCI device supported by PXB 160, PXB 161, or GXB 170, received through I2C port 136 from external device 192, and/or received through JTAG port 137 from external device 194. SFX 308 helps control access to the configuration space of PXB 160, PXB 161,. GXB 170, and any suitable device coupled to PXB 160, PXB 161, or GXB 170. SCD 310 helps control access to the local configuration space of SAC 130 and to the remote configuration space of SDC 140, each MAC 156, each MDC 158, and any suitable I2C device coupled to I2C port 135.

PROCESSOR-INITIATED CONFIGURATION ACCESS

Each processor 102, 104, 106, or 108 may initiate a configuration access in any suitable manner. For one embodiment, a processor-initiated configuration access comprises the writing of a configuration address to a processor configuration address register mapped in the I/O address space of the processor followed by a read of configuration data from or a write of configuration data to an I/O mapped processor configuration data register. For one embodiment, each request directed to the I/O mapped processor configuration address or data register is deferred. That is, no other processor-initiated configuration access requests are issued until a deferred reply response is given.

The address register may comprise any suitable address information for a configuration access. The address register for one embodiment comprises, in accordance with the PCI addressing format, an eight bit bus number identifying the bus of the target device for the configuration access, a five bit device number identifying the target device on the identified bus, a three bit function number identifying the function of the target configuration register or other suitable memory location within the target device, and an eight bit register number identifying the target configuration register or other suitable memory location. One PCI addressing format is defined by Configuration Mechanism #1 of PCI Local Bus Specification, Revision 2.1, from PCI Special Interest Group of Portland, Ore.

For a processor-initiated I/O mapped configuration address register write, for one embodiment, SPI 302 observes on processor bus 110 an I/O write request directed to the address of the processor configuration address register and forwards the request to SCD 310. SMI 304 observes the request forwarded to SCD 310 and sends a command over private command bus 112 to SDC 140 to request that SDC 140 forward the write data for the request to SAC 130. SPB/SDT 306 receives the write data from SDC 140 over private data bus 114 and forwards the write data to SCD 310. SCD 310 stores the write data in the processor configuration address register. SCD 310 also calculates the destination or target device from the configuration address and reformats the address as necessary in accordance with the communication protocol required by the destination to perform a configuration access. SCD 310 sends the decoded destination and reformatted address to SPI 302 over ring bus 320, and SPI 302 updates its respective register corresponding to the processor configuration address register. SCD 310 sends a completion packet to SPI 302 when the information on ring bus 320 returns to SCD 310. SPI 302 then performs a defer reply on processor bus 110, allowing more processor-initiated configuration access requests.

For a processor-initiated I/O mapped configuration address register read, for one embodiment, SPI 302 observes on processor bus 110 an I/O read request directed to the address of the processor configuration address register and forwards the request to SCD 310. SCD 310 returns the content of the processor configuration address register as data through SPB/SDT 306 to SDC 140 over private data bus 114. For normal defers, SMI 304 observes the request forwarded to SCD 310 and sends a command over private command bus 112 to SDC 140 to cause SDC 140 to forward the data to the processor originating the I/O read request. SCD 310 sends a completion packet to SPI 302. SPI 302 then performs a defer reply on processor bus 110. More processor-initiated configuration access requests may then be initiated. For enhanced defers, the configuration access ends with the return of the read data to the originating processor.

For a processor-initiated I/O mapped configuration data register write, for one embodiment, SPI 302 observes on processor bus 110 an I/O write request directed to the address of the processor configuration data register. SPI 302 replaces the address of the I/O write request with the address stored in the SPI register corresponding to the processor configuration address register. SPI 302 converts the I/O write request to a configuration write request and forwards the request to SCD 310 if the decoded destination stored in the SPI register corresponding to the processor configuration address register is SAC 130, SDC 140, any MAC 156, any MDC 158, or any suitable I2C device coupled to I2C port 135. If the decoded destination is PXB 160, PXB 161, GXB 170, or any suitable device coupled to PXB 160, PXB 161, or GXB 170, SPI 302 forwards the request to SFX 308. SMI 304 observes the request forwarded to SCD 310 or SFX 308 and sends a command over private command bus 112 to SDC 140 to request that SDC 140 forward the write data for the request to SAC 130. SPB/SDT 306 receives the write data from SDC 140 over private data bus 114 and forwards the write data to SCD 310 or SFX 308, depending on which one is to handle the request. Upon receiving the data, SCD 310 or SFX 308 performs the configuration write to the configuration space of the decoded destination and then sends a completion packet to SPI 302. SPI 302 then performs a defer reply on processor bus 110, allowing more processor-initiated configuration access requests.

For a processor-initiated I/O mapped configuration data register read, for one embodiment, SPI 302 observes on processor bus 110 an I/O read request directed to the address of the processor configuration data register. SPI 302 replaces the address of the I/O read request with the address stored in the SPI register corresponding to the processor configuration address register. SPI 302 converts the I/O read request to a configuration read request and forwards the request to SCD 310 if the decoded destination stored in the SPI register corresponding to the processor configuration address register is SAC 130, SDC 140, any MAC 156, any MDC 158, or any suitable I2C device coupled to I2C port 135. If the decoded destination is PXB 160, PXB 161, GXB 170, or any suitable device coupled to PXB 160, PXB 161, or GXB 170, SPI 302 forwards the request to SFX 308. SCD 310 or SFX 308, depending on which one is to handle the request, then performs the configuration read to obtain the requested data from the configuration space of the decoded destination and forwards the read data through SPB/SDT 306 to SDC 140 over private data bus 114. For normal defers, SMI 304 observes the request forwarded to SCD 310 or SFX 308 and sends a command over private command bus 112 to SDC 140 to cause SDC 140 to forward the data to the processor originating the I/O read request. SCD 310 or SFX 308, depending on which one handled the configuration read, sends a completion packet to SPI 302. SPI 302 then performs a defer reply on processor bus 110. More processor-initiated configuration accesses may then be initiated. For enhanced defers, the configuration access ends with the return of the read data to the originating processor.

PCI-INITIATED CONFIGURATION ACCESS

Any suitable PCI device coupled to PXB 160, PXB 161, or GXB 170, for example, may initiate a configuration access in any suitable manner. For one embodiment, a PCI-initiated configuration access comprises the writing of a configuration address to a memory mapped PCI configuration address register followed by a read of configuration data from or a write of configuration data to a memory mapped PCI configuration data register. The use of these memory mapped PCI configuration address and data registers is independent of the I/O mapped processor configuration address and data registers. For one embodiment, select requests directed to the memory mapped PCI configuration address or data register cause subsequent memory mapped configuration requests to be retried until the pending request has been completed.

The PCI configuration address register may comprise any suitable address information for a configuration access. The PCI configuration address register for one embodiment comprises address information in accordance with the PCI addressing format.

For a PCI-initiated memory mapped configuration address register write, for one embodiment, SFX 308 receives a memory write request directed to the address of the PCI configuration address register from I/O port 131, 132, 133, or 134, for example, and forwards the request to SPI 302. SPI 302 forwards the request to SCD 310 and sets a memory configuration busy flag indicating SCD 310 cannot accept another memory mapped configuration access request. While this flag is set, SPI 302 retries each subsequent request directed to the memory mapped PCI configuration address or data register by sending a retry to SFX 308 which forwards the retry as a retry completion through the I/O port originating the subsequent request. As SCD 310 receives the request, SFX 308 sends a completion packet through the originating I/O port. SFX 308 sends the write data to SCD 310 through SPB/SDT 306. SCD 310 stores the write data in the PCI configuration address register. SCD 310 also calculates the destination or target device from the configuration address and reformats the address as necessary in accordance with the communication protocol required by the destination to perform a configuration access. SCD 3 10 sends the decoded destination and reformatted address to SPI 302 over ring bus 320, and SPI 302 updates its respective register corresponding to the PCI configuration address register. SCD 310 signals SPI 302 to clear the memory configuration busy bit when the information on ring bus 320 returns to SCD 310. SPI 302 then will no longer retry the next PCI configuration access request.

For a PCI-initiated memory mapped configuration address register read, for one embodiment, SFX 308 receives a memory read request directed to the address of the PCI configuration address register from I/O port 131, 132, 133, or 134, for example, and forwards the request to SPI 302. SPI 302 forwards the request to SCD 310 and sets the memory configuration busy flag indicating SCD 310 cannot accept another memory mapped configuration request. While this flag is set, SPI 302 retries any requests directed to the memory mapped PCI configuration address or data register. SCD 310 returns the content of the PCI configuration address register as data through SPB/SDT 306 to SFX 308 and signals SPI 302 to clear the memory configuration busy bit. SPI 302 then will no longer retry the next PCI configuration access request. SFX 308 sends a completion packet with the read data through the originating I/O port.

For a PCI-initiated memory mapped configuration data register write, for one embodiment, SFX 308 receives a memory write request directed to the address of the PCI configuration data register from I/O port 131, 132, 133, or 134, for example, and forwards the request to SPI 302. SPI 302 replaces the address of the memory write request with the address stored in the SPI register corresponding to the PCI configuration address register. SPI 302 converts the memory write request to a configuration write request and forwards the request to SCD 310 if the decoded destination stored in the SPI register corresponding to the PCI configuration address register is SAC 130, SDC 140, any MAC 156, any MDC 158, or any suitable I2C device coupled to I2C port 135. If the decoded destination is PXB 160, PXB 161, GXB 170, or any suitable device coupled to PXB 160, PXB 161, or GXB 170, SPI 302 forwards the request to SFX 308. As SCD 310 or SFX 308 receives the request, SFX 308 sends a completion packet through the originating I/O port.

If SCD 310 is to handle the request, SPI 302 sets the memory configuration busy flag indicating SCD 310 cannot accept another memory mapped configuration access request. While this flag is set, SPI 302 retries any requests directed to the memory mapped PCI configuration address or data register. SPI 302 does not set the memory configuration busy flag if SFX 308 is to handle the request. SFX 308 forwards the write data for the request to SCD 310 or SFX 308, depending on which one is to handle the request, through SPB/SDT 306. Upon receiving the data, SCD 310 or SFX 308 performs the configuration write to the configuration space of the decoded destination. If SCD 310 handled the configuration write, SCD 310 signals SPI 302 to clear the memory configuration busy bit.

For a PCI-initiated memory mapped configuration data register read, for one embodiment, SFX 308 receives a memory read request directed to the address of the PCI configuration data register from I/O port 131, 132, 133, or 134, for example, and forwards the request to SPI 302. SPI 302 replaces the address of the memory read request with the address stored in the SPI register corresponding to the PCI configuration address register. SPI 302 converts the memory read request to a configuration read request and forwards the request to SCD 310 if the decoded destination stored in the SPI register corresponding to the PCI configuration address register is SAC 130, SDC 140, any MAC 156, any MDC 158, or any suitable I2C device coupled to I2C port 135. If the decoded destination is PXB 160, PXB 161, GXB 170, or any suitable device coupled to PXB 160, PXB 161, or GXB 170, SPI 302 forwards the request to SFX 308. If SCD 310 is to handle the request, SPI 302 sets the memory configuration busy flag indicating SCD 310 cannot accept another memory mapped configuration access request. While this flag is set, SPI 302 retries any requests directed to the memory mapped PCI configuration address or data register. SPI 302 does not set the memory configuration busy flag if SFX 308 is to handle the request. SCD 310 or SFX 308, depending on which one is to handle the request, then performs the configuration read to obtain the requested data from the configuration space of the decoded destination and forwards the read data through SPB/SDT 306 to SFX 308. SFX 308 sends a completion packet with the read data through the originating I/O port. If SCD 310 handled the configuration write, SCD 310 signals SPI 302 to clear the memory configuration busy bit.

I2C/JTAG PORT INITIATED CONFIGURATION ACCESS

Figure 4:
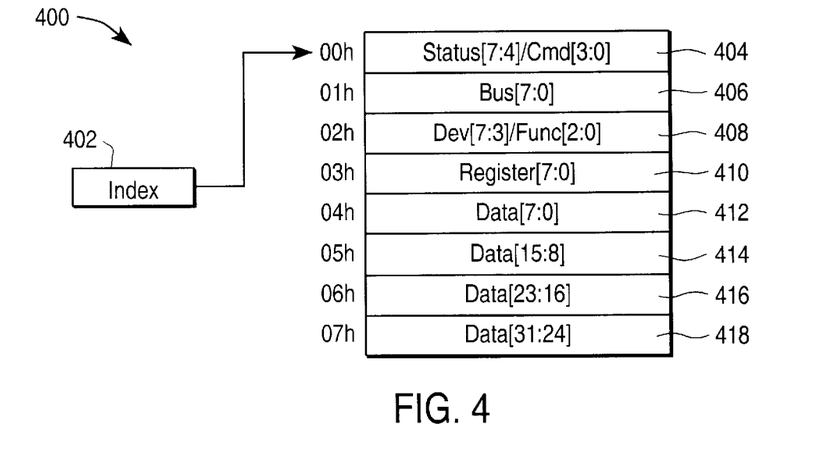
FIG. 4 illustrates, for one embodiment, registers for an inter-integrated circuit (I2C) port of the SAC of FIG. 1.

External device 192 may initiate a configuration access through I2C slave port 136 in any suitable manner. For one embodiment, a configuration access initiated by external device 192 comprises the writing of a configuration access request into at least one register in I2C port 136. For one embodiment, as illustrated in FIG. 4, I2C port 136 comprises a register set 400 for receiving configuration access requests in accordance with the PCI addressing format. Register set 400 comprises an index register 402, a status/command register 404, a bus number register 406, a device number and function number register 408, a register number register 410, and four data registers 412, 414, 416, and 418.

Index register 402 is used for indexing status/command register 404, bus number register 406, device number and function number register 408, register number register 410, and data registers 412, 414, 416, and 418 in writing information to and reading information from register set 400.

Status/command register 404 comprises four status bits in register bit locations 7 through 4, or [7:4], and four command bits [3:0]. The status bits comprise an error bit [7] which is set when a configuration access request returns a hard fail condition. The error bit is read only and cleared when status/command register 404 is overwritten with a new command. The status bits also comprise three reserved bits [6:4]. The command bits comprise an enable bit [3] for enabling I2C port 136 to access a configuration space. The command bits also comprise byte enable command bits [2:0]. Setting the byte enable command bits to 001 designates a write byte configuration access request, to 010 designates a write word configuration access request, to 011 designates a write double word configuration access request, and to 100 designates a read double word configuration access request.

In accordance with the PCI addressing format, bus number register 406 comprises eight bits [7:0] for the bus number of the target device, device number and function number register 408 comprises five bits [7:3] for the device number and three bits [2:0] for the function number, and register number register 410 comprises eight bits [7:0] for the register number.

Data register 412 comprises the least significant byte [7:0] of the read or write data for a configuration access request, data register 414 comprises the second least significant data byte [15:8], data register 416 comprises the second most significant data byte [23:16], and data register 418 comprises the most significant data byte [31:24].

For one embodiment, bits [1:0] of register number register 410 are masked to 00 for double word accesses so all four data bytes are used, bit [0] is masked for word accesses so the two least significant data bytes are used, and no bits are masked for byte accesses so the least significant data byte is used.

Figure 5:
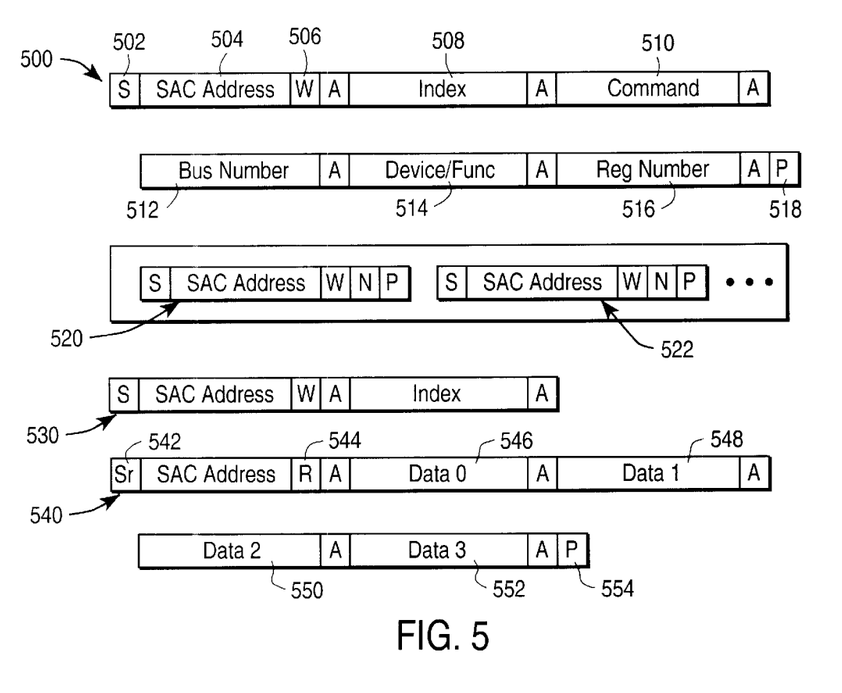
FIG. 5 illustrates an exemplary I2C configuration read request.

FIG. 5 illustrates an exemplary I2C configuration read request 500 comprising a START indicator S 502, a SAC address 504, an I2C command write indicator W 506, an index 508, a command 510, a bus number 512, device and function numbers 514, a register number 516, and a STOP indicator P 518. Request 500 is directed to the assigned address for I2C port 136 as determined by SAC address 504. As this request is an I2C write command, as indicated by write indicator W 506, external device 192 writes index 508 into index register 402, command 510 into the register pointed to by the content of index register 402, that is into status/command register 404, bus number 512 into the subsequent register, that is bus register 406, etc., until external device 192 issues STOP indicator 518. I2C port 136 acknowledges the receipt of each portion of request 500 to external device 192 with an acknowledgement (ACK) indicator A. If the last register has been written and I2C port 136 receives additional information, I2C port 136 will issue a no acknowledgement (NACK) indicator N informing external device 192 that no more registers remain in the sequence.

SAC 130 performs the configuration access in accordance with request 500. For one embodiment, SAC 130 performs the configuration access only when the I2C command sequence comprises a write to command register 404 and ends with a STOP indicator P. Once the configuration access has been initiated, I2C port 136 for one embodiment remains busy. If external device 192 attempts to access I2C port 136 while busy, I2C port 136 issues a NACK indicator N, and external device 192 then issues a STOP indicator P, as illustrated by requests 520 and 522. When the configuration access has been completed, external device 192 may then access I2C port 136.

To obtain the read data for the configuration access from I2C port 136, external device 192 should ensure the content of index register 402 points to data register 412. External device 192 for one embodiment issues an I2C command 530 to set index register 402 followed by an I2C read command 540 comprising a REPEATED START indicator Sr 542 and a read indicator R 544. I2C port 136 reads data from the register pointed to by index register 402, that is from data register 412, and returns it as data 546 to external device 192. I2C port 136 then reads data from the next subsequent register, that is from data register 414, and returns it as data 548 to external device 192. I2C port 136 similarly returns data 550 and 552 from data registers 416 and 418, respectively. I2C port 136 continues returning data until external device 192 issues a STOP indicator P 552. External device 192 acknowledges the receipt of each data portion 546, 548, 550, and 552 with an ACK indicator A.

Figure 6:
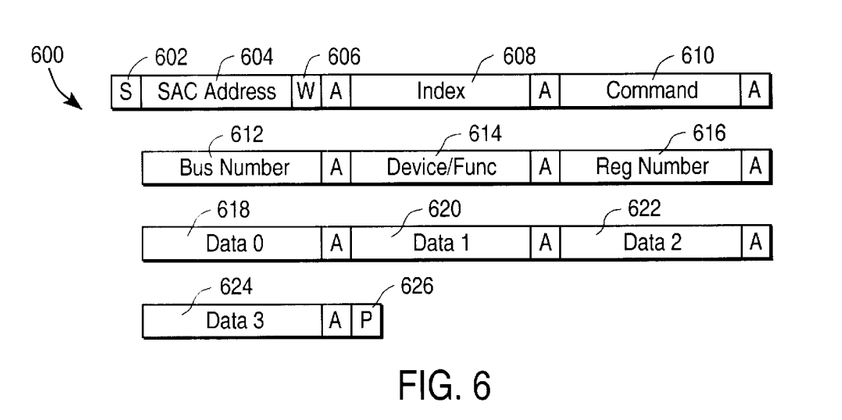
FIG. 6 illustrates an exemplary I2C configuration write request.

FIG. 6 illustrates an exemplary I2C configuration write request 600 comprising a START indicator S 602, a SAC address 604, an I2C command write indicator W 606, an index 608, a command 610, a bus number 612, device and function numbers 614, a register number 616, data 618, 620, 622, and 624, and a STOP indicator P 626. In accordance with request 600, external device 192 writes into each register of register set 400 in sequence until external device 192 issues STOP indicator P 626. I2C port 136 acknowledges the receipt of each portion of request 600 to external device 192 with an ACK indicator A. SAC 130 then performs the configuration access in accordance with request 600.

Figure 7:
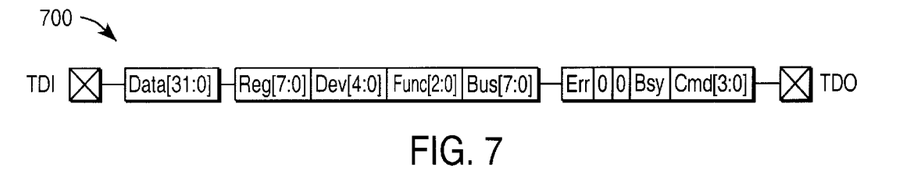
FIG. 7 illustrates, for one embodiment, a configuration access chain for a JTAG port of the SAC of FIG. 1.

External device 194 may initiate a configuration access through JTAG port 137 in any suitable manner. For one embodiment, a configuration access initiated by external device 194 comprises the writing of a configuration access request to JTAG port 137. The configuration access request comprises a configuration access instruction to select a configuration access chain of serial registers followed by command and address information and data for configuration writes. As illustrated in FIG. 7, JTAG port 137 for one embodiment connects a configuration access chain 700 between a test data input (TDI) signal interface and a test data output (TDO) signal interface of JTAG port 137 for receiving the command, address, and/or data information. Chain 700 comprises similar information as I2C register set 400 of FIG. 4. For chain 700, however, status/command bit [4] indicates whether JTAG port 137 is busy with a pending configuration access request. JTAG port 137 for one embodiment does not receive any further configuration requests while busy.

For an I2C or JTAG port initiated configuration read, for one embodiment, SCD 310 receives a configuration read request through either I2C port 136 or JTAG port 137. SCD 310 determines whether the received configuration read request targets the configuration space of PXB 160, PXB 161, GXB 170, or any suitable device coupled to PXB 160, PXB 161, or GXB 170, and, if so, SCD 310 forwards a configuration type request with the destination to SPI 302. SPI 302 then forwards the configuration type request to SFX 308 to handle the request. If the received configuration read request targets SAC 130, SDC 140, any MAC 156, any MDC 158, or any suitable I2C device coupled to I2C port 135, SCD 310 handles the configuration read request. SCD 310 or SFX 308, depending on which one is to handle the request, performs the configuration read to obtain the requested data from the configuration space of the destination and forwards the read data to the originating I2C port 136 or JTAG port 137. If SFX 308 handled the configuration read, SFX 308 forwards the read data through SPB/SDT 306 to SCD 310, and SCD 310 forwards the read data to the originating I2C port 136 or JTAG port 137.

For an I2C or JTAG port initiated configuration write, for one embodiment, SCD 310 receives a configuration write request through either I2C port 136 or JTAG port 137. SCD 310 determines whether the received configuration write request targets the configuration space of PXB 160, PXB 161, GXB 170, or any suitable device coupled to PXB 160, PXB 161, or GXB 170, and, if so, SCD 310 forwards a configuration type request with the destination to SPI 302. SPI 302 then forwards the configuration type request to SFX 308 to handle the request, and SCD 310 forwards the write data through SPB/SDT 306 to SFX 308. If the received configuration write request targets SAC 130, SDC 140, any MAC 156, any MDC 158, or any suitable I2C device coupled to I2C port 135, SCD 310 handles the configuration write request. SCD 310 or SFX 308, depending on which one is to handle the request, performs the configuration write to the configuration space of the destination.

CONFIGURATION ACCESS TO PXB/GXB/PCI/AGP

If the configuration space of PXB 160, PXB 161, GXB 170, or any suitable device coupled to PXB 160, PXB 161, or GXB 170 is the target of a configuration access request, SFX 308 performs the configuration access by sending a suitable configuration request through the I/O port corresponding to the target device. For a configuration read transaction, SFX 308 then obtains the read data for the request through the same I/O port.

CONFIGURATION ACCESS TO SAC

If the configuration space of SAC 130 is the target of a configuration access request, SCD 310 performs the configuration access by sending a suitable configuration access request on ring bus 320. When SMI 304 receives the request, SMI 304 determines whether the transaction is directed to any configuration space in SMI 304. If so, SMI 304 for configuration write requests writes the write data from the transaction to the target space and for configuration read requests reads the data from the target space and inserts the read data into the request for return to SCD 310. SPI 302 and SFX 308 similarly respond to the configuration access request on ring bus 320. The return of the transaction to SCD 310 signals the end of the configuration access.

CONFIGURATION ACCESS TO SDC

If the configuration space of SDC 140 is the target of a configuration access request, SCD 310 performs the configuration access by sending a suitable configuration type command to SDC 140 through SMI 304 and sending an address/data packet through SPB/SDT 306 and over private data bus 114 to SDC 140. For a configuration write, both the address and data in the address/data packet is valid. For a configuration read, only the address is valid.

Figure 8:
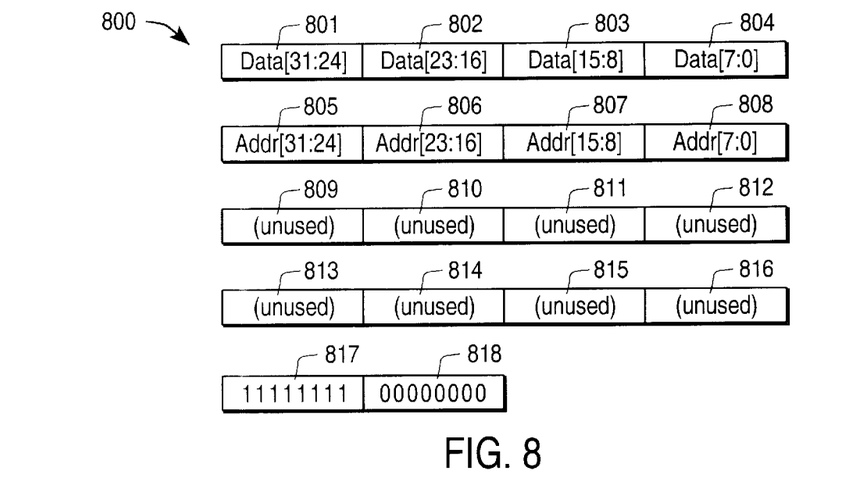
FIG. 8 illustrates, for one embodiment, an address/data packet for a configuration access to a system data chip (SDC)

The address/data packet may have any suitable format, such as that of address/data packet 800 of FIG. 8. Packet 800 comprises 16 data bytes 801, 802, 803, 804, 805, 806, 807, 808, 809, 810, 811, 812, 813, 814, 815, and 816, and two byte enable bytes 817 and 818. Data bytes 801–804 comprise read or write data for a configuration access, and data bytes 805–808 comprise address information for the configuration access. For one embodiment, such address information comprises information in the PCI addressing format. For the configuration address, bit [31] is a configuration access enable bit, bits [30:28] are reserved, bits [27:24] are byte enable bits each corresponding to a respective one of data bytes 801, 802, 803, and 804, bits [23:16] comprise a bus number, bits [15: 11] comprise a device number, bits [10:8] comprise a function number, and bits [7:0] comprise a register number. Each bit of byte enable bytes 817 and 818 enables a respective data byte 801–816.

SDC 140 returns an address/data packet across private data bus 114 and through SPB/SDT 306 to SCD 310. For a configuration write, this packet only indicates the completion of the configuration write. For a configuration read, this packet contains valid read data.

CONFIGURATION ACCESS TO I2C/MAC/MDC

If the configuration space of any MAC 156, any MDC 158, or some other suitable I2C device coupled to I2C master port 135 is the target of a configuration access request, SCD 310 performs the configuration access by sending a suitable I2C configuration access command through I2C port 135.

Figure 9:
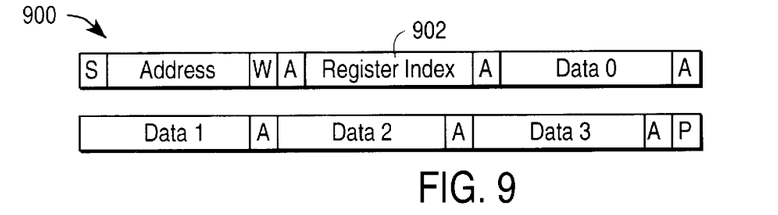
FIG. 9 illustrates an exemplary I2C configuration write with index.
Figure 10:
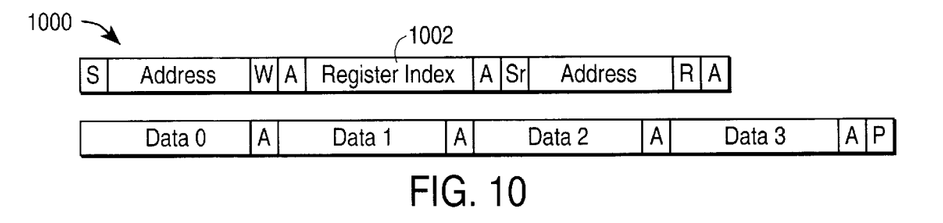
FIG. 10 illustrates an exemplary I2C configuration read with index.
Figure 11:
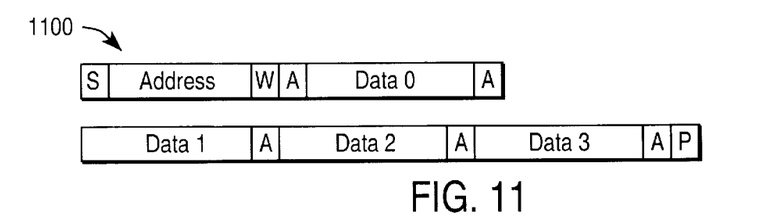
FIG. 11 illustrates an exemplary I2C configuration write without index.
Figure 12:
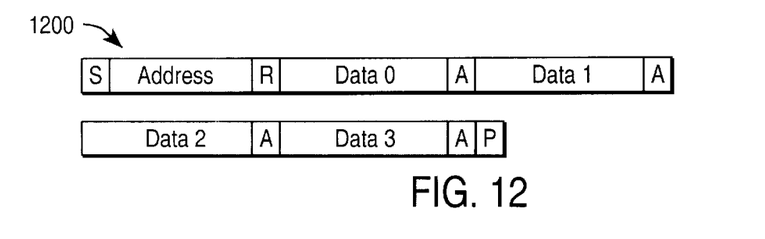
FIG. 12 illustrates an exemplary I2C configuration read without index.

FIG. 9 illustrates, for one embodiment, an exemplary I2C configuration write 900 comprising a register index 902, and FIG. 10 illustrates, for one embodiment, an exemplary I2C port configuration read comprising a register index 1002. FIG. 11 illustrates, for one embodiment, an exemplary I2C port configuration write 1100 without an index, and FIG. 12 illustrates, for one embodiment, an exemplary I2C port configuration read without an index. The formatting of configuration accesses 900, 1000, 1100, and 1200 is similar to that illustrated in FIGS. 5 and 6. I2C port 135 for one embodiment may read and write up to four bytes of data. For configuration writes less than four bytes, I2C port 135 issues a STOP indicator P when finished. For configuration reads less than four bytes, the target device issues an ACK indicator A after the last valid byte, and I2C port 135 issues a STOP indicator P.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
   receiving by a local integrated circuit device configuration access requests through one of at least two interfaces using a first communication protocol; and
   accessing a configuration space of one or more remote integrated circuit devices in accordance with the received configuration access requests, but using a second communication protocol which is different than the first communication protocol.

2. The method of claim 1, wherein the receiving comprises receiving configuration access requests through the at least two interfaces using different communication protocols.

3. The method of claim 1, wherein the at least two interfaces for receiving configuration access requests comprise a joint test action group (JTAG) port, an inter-integrated circuit (I2C) port, a processor interface, and/or a peripheral component interface (PCI).

4. The method of claim 1, wherein one of the configuration access requests received through the at least two interfaces uses addressing information in a peripheral component interface (PCI) addressing format to identify a target memory location for the configuration access request.

5. The method of claim 1, wherein the accessing comprises accessing the configuration space of at least two remote integrated circuit devices using different communication protocols.

6. The method of claim 1, wherein the accessing comprises accessing a configuration register in the configuration space of one or more remote integrated circuit devices.

7. An integrated circuit device comprising:
  at least two interfaces to receive configuration access requests, wherein one of the at least two interfaces uses a first communication protocol; and
  accessing circuitry to access a configuration space of one or more remote integrated circuit devices in accordance with the received configuration access requests, but to use a second communication protocol which is different than the first communication protocol.

8. The integrated circuit device of claim 7, wherein the at least two interfaces to receive configuration access requests using different communication protocols.

9. The integrated circuit device of claim 7, wherein the at least two interfaces comprise a joint test action group (JTAG) port, an inter-integrated circuit (I2C) port, a processor interface, and/or a peripheral component interface (PCI).

10. The integrated circuit device of claim 7, wherein one of the configuration access requests to be received through the at least two interfaces uses addressing information in a peripheral component interface (PCI) addressing format to identify a target memory location for the configuration access request.

11. The integrated circuit device of claim 7, wherein the accessing circuitry accesses the configuration space of at least two remote integrated circuit devices using different communication protocols.

12. The integrated circuit device of claim 7, wherein the accessing circuitry to access a configuration register in the configuration space of one or more remote integrated circuit devices.

13. A system comprising:
  (a) a plurality of remote integrated circuit devices having respective configuration spaces; and
  (b) a local integrated circuit device comprising:
    (i) at least two interfaces to receive configuration access requests, wherein one of the at least two interfaces uses a first communication protocol; and
    (ii) accessing circuitry to access the configuration space of at least one of the plurality of remote integrated circuit devices in accordance with the received configuration access requests, but to: use a second communication protocol which is different than the first communication protocol.

14. The system of claim 13, wherein the at least two interfaces to receive configuration access requests using different communication protocols.

15. The system of claim 13, wherein the at least two interfaces comprise a joint test action group (JTAG) port, an inter-integrated circuit (I2C) port, a processor interface, and/or a peripheral component interface (PCI).

16. The system of claim 13, wherein one of the configuration access requests to be received through the at least two interfaces uses addressing information in a peripheral component interface (PCI) addressing format to identify a target memory location for the configuration access request.

17. The system of claim 13, wherein the accessing circuitry accesses the configuration space of at least two remote integrated circuit devices using different communication protocols.

18. The system of claim 13, wherein the accessing circuitry accesses a configuration register in the configuration space of one of the plurality of remote integrated circuit devices.

19. The system of claim 13, wherein the local integrated circuit device comprises a system addressing device.

20. The system of claim 13, wherein the plurality of remote integrated circuit devices comprise a system data device, a memory addressing device, a memory data device, an input/output expander bridge, and/or a graphics expander bridge.

21. The system of claim 13, further comprising:
  (c) at least two external devices coupled to the at least two interfaces to issue configuration access requests.

22. The system of claim 21, wherein the at least two external devices comprise a processor, a peripheral component interface (PCI) device, a server management device, a test device, and/or a debug device.

23. A system comprising:
  (a) one or more processors;
  (b) memory;
  (c) one or more input/output devices;
  (d) one or more remote integrated circuit devices having respective configuration spaces; and
  (e) a local integrated circuit device comprising:
    (i) at least two interfaces to receive configuration access requests, wherein one of the at least two interfaces uses a first communication protocol; and
    (ii) accessing circuitry to access the configuration space of at least one of the one or more remote integrated circuit devices in accordance with the received configuration access requests, but to use a second communication protocol which is different than the first communication protocol.

24. The system of claim 23, wherein the local integrated circuit device comprises a system addressing device; and
  wherein the one or more remote integrated circuit devices comprise a system data device, a memory addressing device, a memory data device, an input/output expander bridge, and/or a graphics expander bridge.

* * * * *

UNITED STATES PATENT AND TRADEMARK OFFICE
CERTIFICATE OF CORRECTION

PATENT NO. : 6,553,439 B1
DATED : April 22, 2003
INVENTOR(S) : Greger et al.

It is certified that error appears in the above-identified patent and that said Letters Patent is hereby corrected as shown below:

Column 3,
Line 11, delete "10", insert -- 110 --.
Line 31, before "comprise", delete ",".

Column 6,
Lines 9 and 11, delete "SMX", insert -- SMI --.

Signed and Sealed this

Twelfth Day of August, 2003

JAMES E. ROGAN
*Director of the United States Patent and Trademark Office*